(12) United States Patent
Yoon et al.

(10) Patent No.: US 10,147,393 B2
(45) Date of Patent: Dec. 4, 2018

(54) DISPLAY APPARATUS AND CONTROL METHOD THEREOF

(71) Applicant: SAMSUNG ELECTRONICS CO., LTD., Suwon-si, Gyeonggi-do (KR)

(72) Inventors: Min-kyung Yoon, Suwon-si (KR); Won-pil Kim, Suwon-si (KR); Dae-hyun Nam, Anyang-si (KR); Jae-eun Cheong, Yangju-si (KR)

(73) Assignee: SAMSUNG ELECTRONICS CO., LTD., Suwon-si, Gyeonggi-do (KR)

( * ) Notice: Subject to any disclaimer, the term of this patent is extended or adjusted under 35 U.S.C. 154(b) by 7 days.

(21) Appl. No.: 15/603,598

(22) Filed: May 24, 2017

(65) Prior Publication Data

US 2018/0012561 A1 Jan. 11, 2018

(30) Foreign Application Priority Data

Jul. 7, 2016 (KR) ........................ 10-2016-0086065

(51) Int. Cl.
*G09G 5/10* (2006.01)
*G06F 3/147* (2006.01)
*G09G 5/00* (2006.01)

(52) U.S. Cl.
CPC .............. *G09G 5/10* (2013.01); *G06F 3/147* (2013.01); *G09G 5/00* (2013.01); *G09G 2320/0646* (2013.01); *G09G 2360/144* (2013.01)

(58) Field of Classification Search
CPC .... G09G 2320/0646; G09G 5/10; G09G 5/00; G09G 2360/144; G06F 3/147
See application file for complete search history.

(56) References Cited

U.S. PATENT DOCUMENTS

2003/0147053 A1\* 8/2003 Matsuda ................ G09G 1/285
353/31
2017/0047019 A1\* 2/2017 Li ............................ G09G 3/36

FOREIGN PATENT DOCUMENTS

KR     10-2005-0073518     7/2005

\* cited by examiner

*Primary Examiner* — Abbas Abdulselam
(74) *Attorney, Agent, or Firm* — Nixon & Vanderhye, P.C.

(57) ABSTRACT

Disclosed are a display apparatus and a control method thereof, the display apparatus including: a signal receiver configured to receive a video signal; a signal processor configured to process the received video signal; a display configured to display a first image based on the processed video signal; and a controller configured to control the signal processor to increase grayscale of the video signal corresponding to the first image if ambient illumination is equal to or higher than an illumination threshold and grayscale of the first image is equal to or lower than a first grayscale threshold, and to control the display to display a second image based on a video signal increased in the grayscale. Thus, it is possible to minimize and/or reduce glare due to optical reflectivity.

20 Claims, 10 Drawing Sheets

DISPLAY APPARATUS AND CONTROL METHOD THEREOF

CROSS-REFERENCE TO RELATED APPLICATION

This application is based on and claims priority under 35 U.S.C. § 119 to Korean Patent Application No. 10-2016-0086065 filed on Jul. 7, 2016 in the Korean Intellectual Property Office, the disclosure of which is incorporated by reference herein in its entirety.

BACKGROUND

Field

The present disclosure relates generally to a display apparatus and a control method thereof, in which grayscale of an input image is adjusted to control brightness of a displayed image.

Description of Related Art

With development of technology, researches on a display apparatus have been continued to provide a user with unconventional functions based on a new material as well as a larger image size, higher image quality, etc.

For example, there is a mirror display that has high optical reflectivity to reflect an object placed in front of the display like a mirror.

FIG. 1 illustrates an example of a conventional display apparatus 100 with the mirror display. The mirror display can reflect incident light, e.g., an object placed in front thereof like a mirror when the display apparatus 100 is turned off or when a displayed image has low brightness.

Referring to FIG. 1, the display apparatus 100 is displaying an image while being illuminated with light 101 emitted from an external light source 2. At this time, a user sees light 103 reflected from an area 102 corresponding to low brightness, i.e. low grayscale in an image displayed on the mirror display. That is, the conventional display apparatus 100 is inconvenient for a user since the mirror display causes glare or overlaps a displayed image with an object placed in front thereof by reflecting the incident light 101 like a mirror. In particular, if the display employs a local dimming technique of decreasing brightness in the low-grayscale area and increasing brightness in a high-grayscale area, light reflected from the low-grayscale area is more conspicuous than that from the high-grayscale area.

Further, the conventional display apparatus 100 controls brightness to be varied depending on ambient illumination so that a user can easily recognize variation in grayscale of an image. However, it is difficult for a user to recognize the variation in the grayscale in accordance with ambient illumination since the conventional display apparatus 100 does not take the transmittance of the mirror display into account while controlling the brightness.

SUMMARY

Accordingly, an aspect of one or more example embodiments may provide a display apparatus having optical reflectivity and a control method thereof, in which glare is reduced so that a user can more easily view an image.

According to an aspect of an example embodiment, a display apparatus is provided, the display apparatus including: a signal receiver configured to receive a video signal; a signal processor configured to process the received video signal; a display configured to display a first image based on the processed video signal; and a controller configured to control the signal processor to increase grayscale of the video signal corresponding to the first image if ambient illumination is equal to or higher than an illumination threshold and grayscale of the first image is equal to or lower than a first grayscale threshold, and to control the display to display a second image based on a video signal increased in the grayscale. Thus, it is possible to minimize and/or reduce glare due to optical reflectivity.

The controller may control the signal processor to increase grayscale of a video signal corresponding to a partial area, of which grayscale is equal to or lower than a second grayscale threshold, on the first image. Thus, it is possible to improve convenience since grayscale only in a certain area is taken into account.

The controller may control the display to display a user interface (UI) for setting the partial area. Thus, a user's intention is considered when an area for improving antiglare is determined, thereby enhancing usability.

The display apparatus may further include a sensor configured to sense ambient illumination, and the sensor may include: an optical detector comprising optical detection circuitry configured to detect an angle of light incident upon the display; and a position detector comprising position detecting circuitry configured to detect a position of a user, and the controller is configured to control the signal processor to increase grayscale of a video signal corresponding to the partial area if grayscale of the partial areas on the first image is equal to or lower than the second grayscale threshold based on the detected angle of the light and the detected position of the user. Thus, it is possible to improve convenience since an area where a user feels glare is automatically determined.

The display apparatus may further include a communicator comprising communication circuitry configured to communicate with an external sensor that senses ambient illumination and provides information about the sensed ambient illumination. Thus, it is possible to receive information about ambient illumination from the outside.

The first image may include a plurality of pixels, and the controller may be configured to control the signal processor to increase grayscale of a video signal corresponding to a pixel, of which grayscale is equal to or lower than a third grayscale threshold, among the plurality of pixels. Thus, it is possible to improve uniformity of an image by increasing grayscale of all the pixels which have low grayscale.

The controller may control brightness of the image based on the ambient illumination. Thus, an image is improved in visibility.

The display may include: a display panel configured to display an image with emitted light; and a light source configured to emit light to the display panel, and a controller configured to control the brightness of the image by adjusting intensity of light emitted to the display panel. Thus, a means for controlling the brightness of the image is provided.

The display apparatus may further include a sensor configured to sense the brightness of the displayed image, and the controller may be configured to determine transmittance of the display panel based on the sensed brightness of the image and the intensity of light emitted to the display panel, and to adjust the intensity of the light emitted to the display panel based on the determined transmittance and the sensed ambient illumination. Thus, it is possible to more accurately control the brightness of the image since the transmittance of the display panel is taken into account.

The illumination threshold may be varied depending on the grayscale of the first image of which grayscale is equal to or lower than the first grayscale threshold. Thus, it is possible to more accurately determine whether the glare occurs.

According to an aspect of another example embodiment, a method of controlling a display apparatus is provided, the method including: receiving a video signal; processing the received video signal; displaying a first image based on the processed video signal; increasing grayscale of the video signal corresponding to the first image if ambient illumination is equal to or higher than an illumination threshold and grayscale of the first image is equal to or lower than a first grayscale threshold; and displaying a second image based on a video signal increased in the grayscale. Thus, it is possible to minimize and/or reduce glare due to optical reflectivity.

The increasing the grayscale of the video signal may include increasing grayscale of a video signal corresponding to a partial area, of which grayscale is equal to or lower than a second grayscale threshold, on the first image. Thus, it is possible to improve convenience since grayscale only in a certain area is taken into account.

The method may further include displaying a user interface (UI) for setting the partial area. Thus, it is possible to enhance usability since a user's intention is considered.

The increasing the grayscale of the video signal may include: sensing the ambient illumination; detecting an incident angle of light; detecting a position of a user; and increasing grayscale of a video signal corresponding to the partial area if grayscale of the partial areas on the first image is equal to or lower than the second grayscale threshold based on the detected angle of the light and the detected position of the user. Thus, it is possible to improve convenience since an area where a user feels glare is automatically determined.

The method may further include communicating with an external sensor that senses ambient illumination and provides information about the sensed ambient illumination. Thus, a means for receiving information about ambient illumination is provided.

The first image may include a plurality of pixels, and the increasing the grayscale of the video signal may include increasing grayscale of a video signal corresponding to a pixel, of which grayscale is equal to or lower than a third grayscale threshold, among the plurality of pixels. Thus, it is possible to improve uniformity of an image by increasing grayscale of all the pixels which have low grayscale.

The method may further include controlling brightness of the image based on the ambient illumination.

Thus, an image is improved in visibility.

The displaying the first image may include: displaying first image with light emitted to a display panel; and emitting light to the display panel, and the controlling the brightness of the image may include adjusting intensity of light emitted to the display panel. Thus, a means for controlling the brightness of the image is provided.

The adjusting the intensity of light emitted to the display panel may include: sensing the brightness of the displayed image; determining transmittance of the display panel based on the sensed brightness of the image and the intensity of light emitted to the display panel; and adjusting the intensity of the light emitted to the display panel based on the determined transmittance and the sensed ambient illumination. Thus, it is possible to more accurately control the brightness of the image.

The illumination threshold may be varied depending on the grayscale of the first image of which grayscale is equal to or lower than the first grayscale threshold. Thus, it is possible to more accurately determine whether the glare occurs.

BRIEF DESCRIPTION OF THE DRAWINGS

The above and/or other aspects, features and attendant advantages of the present disclosure will become apparent and more readily appreciated from the following detailed description, taken in conjunction with the accompanying drawings, in which like reference numerals refer to like elements, and wherein.

DETAILED DESCRIPTION

Figure 2:
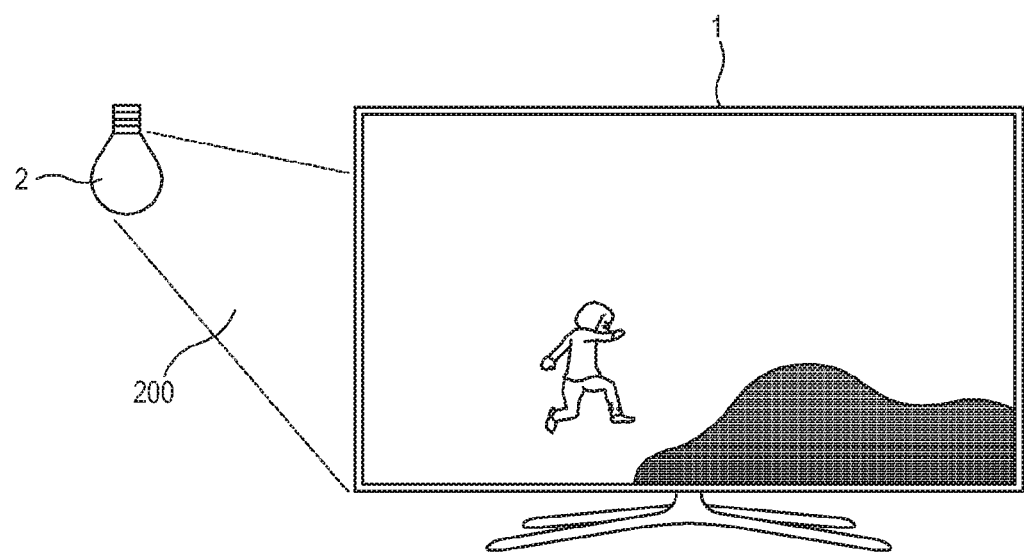
FIG. 2 is a diagram illustrating an example display apparatus according to an example embodiment.

FIG. 2 is a diagram illustrating an example display apparatus according to an example embodiment of the present disclosure.

Figure 3:
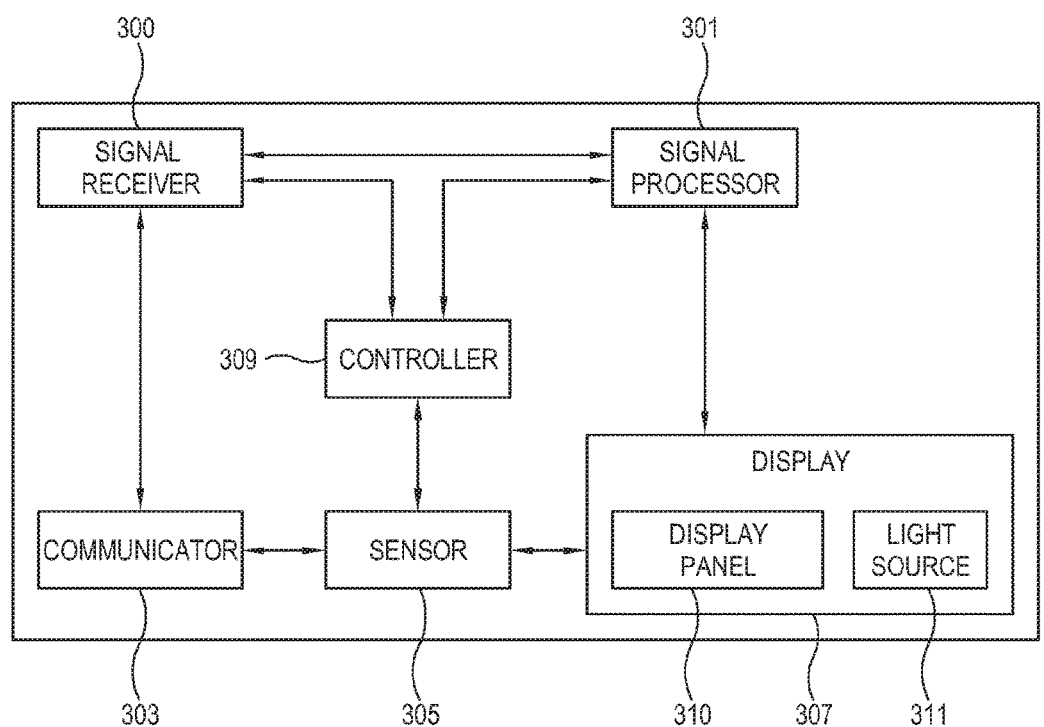
FIG. 3 is a block diagram illustrating an example display apparatus according to an example embodiment.

A display apparatus 1 according to an example embodiment displays an image through a display 307 (refer to FIG. 3). The display 307 includes a display panel 310 (refer to FIG. 3) on which an image is displayed. The display panel 310 has properties of optical reflectivity. If there is no image correction according to an example embodiment, the optical reflectivity of the display panel 310 may cause incident light 200 from an external light source 2 to be reflected and thus make a user feel glare when the display apparatus 1 is turned off or when a displayed image has low brightness, e.g., an input image has low grayscale. To solve this problem, the display apparatus 1 according to an example embodiment increases grayscale of an image if the image displayed on the display panel 310 has low grayscale, so that the reflection of the incident light 200 from the external light source 2 can be inconspicuous, thereby making a user feel no glare.

Figure 1:
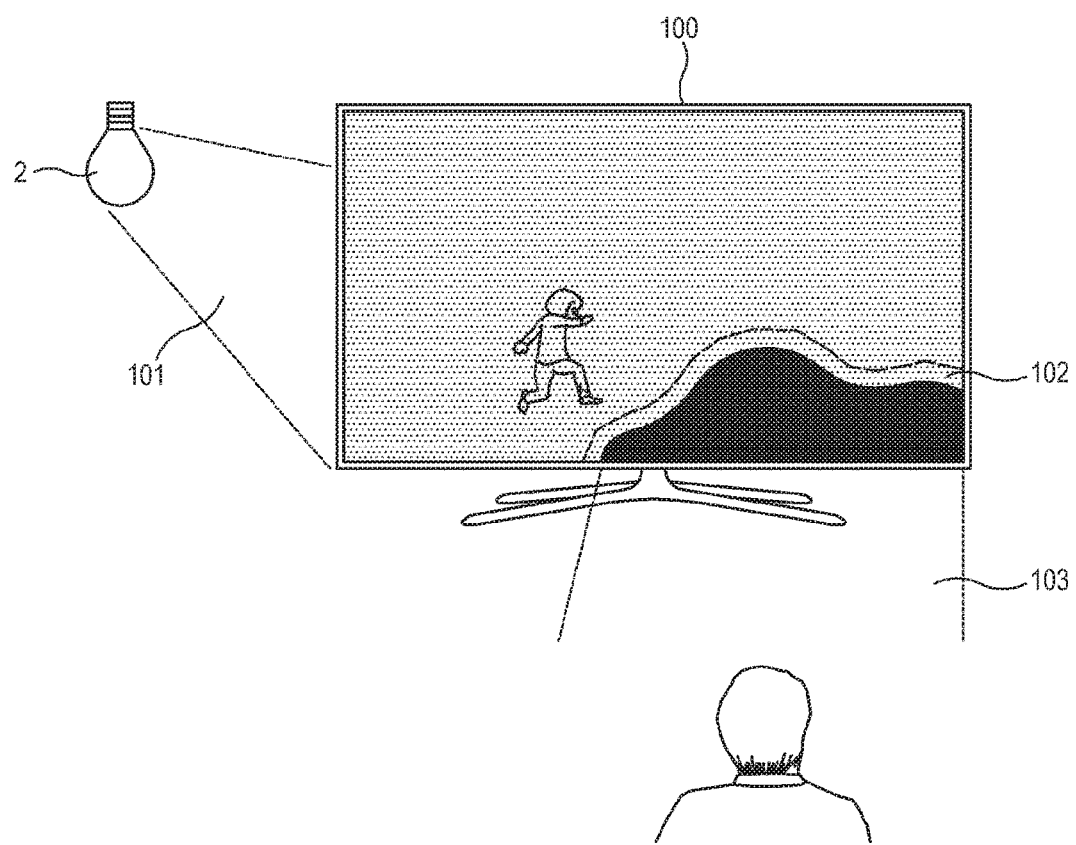
FIG. 1 is a diagram illustrating a conventional display apparatus.

The image displayed on the display apparatus 1 has higher grayscale than the image displayed on the display apparatus 100 of FIG. 1, and therefore light reflected from the low-grayscale area is hardly noticeable.

FIG. 3 is a block diagram illustrating an example display apparatus according to an example embodiment.

According to an example embodiment the display apparatus 1 displays an image based on a received video signal. The display apparatus 1 increases the grayscale of the image if ambient illumination is equal to or higher than a threshold and the grayscale of the image being displayed is equal to or lower than a threshold. To this end, the display apparatus 1 according to an example embodiment includes a signal receiver (e.g., including signal receiving circuitry) 300, a signal processor (e.g., including signal processing circuitry) 301, a communicator (e.g., including communication circuitry) 303, a sensor 305, a display 307 and a controller (e.g., including processing circuitry) 309.

The signal receiver 300 may include various signal receiving circuitry and receives a video signal from the outside. The signal receiver 300 may include, for example, and without limitation, circuitry including a tuner to receive a video signal. The tuner may be tuned to a certain channel selected by a user among a plurality of channels and receive a video signal through the selected channel. The signal receiver 300 may receive a video signal from an image processing device such as a set-top box, a digital versatile disc (DVD) player, a personal computer, etc.; a peripheral device such as a smart phone; a server of storing an image through the Internet; etc.

The signal processor 301 may include various signal processing circuitry and processes a received video signal to be displayed as an image on the display 307. The signal processor 301 may include, for example, and without limitation, circuitry that applies image processing processes such as modulation, demodulation, multiplexing, demultiplexing, analog-digital conversion, digital-analog conversion, decoding, encoding, image enhancement, scaling, etc. to the received video signal. Further, the signal processor 301 may include grayscale of a video signal under control of the controller 309. To this end, the signal processor 301 may include a corrector.

The display 307 displays an image based on a video signal processed by the signal processor 301. The display 307 includes the display panel 310 on which an image based on a processed video signal is displayed, and a light source 311 emitting light to the display panel 310.

The display panel 310 may include a display device such as a liquid crystal display panel or the like. According to an alternative example embodiment, the display may include a self-emissive display device such as an organic light emitting diode (OLED), a plasma display device, or the like, but is not limited thereto.

The light source 311 includes a backlight unit for emitting light, and a driving circuit for driving the backlight unit. The light source 311 may perform local dimming where the backlight unit is divided into a plurality of blocks for individual dimming. That is, the backlight unit is sectioned into a plurality of areas, so that the brightness of the image can be decreased or increased according to the areas.

The display panel 310 displays an image as described above, and reflects an object placed in front of the display apparatus 1. Specifically, the display panel 310 has properties of optical reflectivity, and includes coating, a film, a layered structure or the like functioning as a mirror on one side thereof, thereby reflecting an object placed in front of the side.

To use a mirroring function, a user may decrease brightness and grayscale in a partial area of an image displayed on the display 307, or turn off power of the display apparatus 1. If a user moves close to the display apparatus 1 within a predetermined distance or issues a specific command, the display apparatus 1 may decrease the brightness and the grayscale so that at least a partial area of the image can be used as a mirror. However, some low-grayscale areas of an image may reflect external light while the image is being displayed, even though a user does not make selection to use the mirroring function. Therefore, the display 307 displays an image based on a video signal corrected by the signal processor 301 so that the grayscale of the image cannot be equal to or lower than the grayscale threshold.

The communicator 303 may include various communication circuitry and communicates with an external apparatus. The communicator 303 receives sensing information from an external sensor and transmits it to the controller 309. For example, the external sensor senses ambient illumination or a user's position, and transmits generated illumination or position information to the controller 309 through the communicator 303.

The sensor 305 is provided in the display apparatus 1 and senses ambient illumination or a user's position, thereby transmitting the generated illumination or position information to the controller 309. To this end, the sensor 305 may include various sensors such as an optical detector for detecting intensity, incident angle, etc. of light, and a position detector including circuitry for detecting a position of a user who is using the display apparatus 1. The optical detector includes a light-intensity sensor or the like to detect ambient illumination. The plurality of optical detectors detects an angle of light incident upon the display 307 by sensing a positon upon which light is incident and sensing intensity of light detected in the optical detector. The ambient illumination refers to illumination of an area surrounding the display apparatus 1, and there are no limits to the range of the surrounding area. The sensor 305 may sense not only intensity of external light incident upon the display 307 of the display apparatus 1, but also intensity of light emitted by the display 307.

The controller 309 may include various processing circuitry and controls general operations of the display apparatus 1. Specifically, the controller 309 controls the signal processor 301 to increase the grayscale of a video signal and the display 307 to display an image based on the video signal having the increased grayscale if the ambient illumination is equal to or higher than the illumination threshold and the grayscale of the image displayed on the display 307 is equal to or lower than the grayscale threshold. The threshold may be varied depending on the grayscale of the image being displayed. Since illumination of reflected light becomes lower as the grayscale of the image decreases, the threshold is also lowered. That is, the controller 309 lowers the illumination threshold as the grayscale of the displayed image decreases, and determines whether the grayscale of the displayed image is equal to or lower than the grayscale threshold if the ambient illumination is equal to or higher than the lowered illumination threshold, thereby controlling the signal processor 301 to increase the grayscale of the video signal.

According to an example embodiment, the controller 309 calculates average grayscale of the displayed image if the ambient illumination is equal to or higher than the illumination threshold, and controls the signal processor 301 to increase the grayscale of the video signal if the calculated grayscale is equal to or lower than the grayscale threshold.

That is, if the average grayscale of the whole image is equal to or lower than the grayscale threshold, the grayscale of the whole image increases.

According to another example embodiment, the controller 309 may control the signal processor 301 to increase the grayscale of the video signal corresponding to some areas, on which the grayscale is equal to or lower than the grayscale threshold, in the image. The controller 309 sections the image into a plurality of areas, calculates the average grayscale of each area, and controls the signal processor 301 to increase the grayscale of the video signal corresponding to the area where the calculated grayscale is equal to or lower than the grayscale threshold. That is, if the average grayscale of the whole image is high but light is reflected from only some areas, the grayscale is increased in some areas capable of reflecting light.

According to still another example embodiment, the controller 309 distinguishes between an area where the grayscale is equal to or lower than the grayscale threshold and an area where the grayscale is higher than the grayscale threshold, based on the grayscale of the video signal, and controls the signal processor 301 to increase the grayscale in the area where the grayscale is equal to or lower than the grayscale threshold. Here, there may be a plurality of grayscale thresholds. For example, the controller 309 distinguishes among an area where the grayscale is equal to or lower than a first grayscale threshold, an area where the grayscale is equal to or lower than a second grayscale threshold, an area where the grayscale is equal to or lower than a third grayscale threshold, and an area where the grayscale is higher than the third grayscale threshold, and controls the signal processor 301 to increase the grayscale in the area where the grayscale is equal to or lower than the first grayscale threshold.

According to still another example embodiment, the controller 309 may control the display 307 to display a user interface (UI) for allowing a user to directly set an area to be increased in grayscale. If a user feels the glare while viewing the display apparatus 1, the user may directly set an area, from which the glare will be removed, through the UI. If the grayscale of the area set by the user is equal to or lower than the grayscale threshold, the controller 309 increases the grayscale of the video signal corresponding to the area. According to this example embodiment, it is convenient for a user to set a desired area, from which the glare will be removed, and prevent the glare in the set area.

According to still another example embodiment, the controller 309 may determine ambient illumination, an incident angle of light, a user's position, etc. based on information sensed by the sensor 305. The controller 309 may determine whether reflected light disturbs a user based on the determined ambient illumination, incident angle of light, position of the user, etc. If it is determined that the reflected light disturbs a user, the controller 309 controls the signal processor 301 to increase the grayscale of the video signal if the grayscale of the image is equal to or lower than the grayscale threshold. If a user's position is not free from the reflected light, the controller 309 does not change the grayscale of the image.

The controller 309 may determine the area of the image, from which light is reflected toward a user, based on the determined ambient illumination, incident angle of light, position of the user, etc. The controller 309 determines some areas on the display panel 310, from which light is reflected toward a user, and controls the signal processor 301 to increase grayscale of a video signal corresponding to the determined areas if the grayscale of the determined areas is equal to or lower than the grayscale threshold.

The controller 309 may determine at least one of ambient illumination, an incident angle of light, and a position of a user, based on information received from an external sensor through the communicator 303.

An image includes a plurality of pixels, and each pixel includes a plurality of color components such as red (R), green (G) and blue (B). The signal processor 301 changes color values of each pixel to adjust grayscale of an image under control of the controller 309. The controller 309 calculates an average grayscale of all the pixels based on the color values of all the pixels of the image, and controls the signal processor 301 to increase the color values of all the pixels by a predetermined level if the calculated average grayscale is equal to or lower than the grayscale threshold.

According to still another example embodiment, a video signal includes information about not only the color value of each pixel but also the position of the pixel. The controller 309 controls the signal processor 301 to change a color value of a video signal corresponding to an area, of which the grayscale is equal to or lower than the grayscale threshold, based on the information included in the video signal about the color value and the position.

According to still another example embodiment, the controller 309 controls the signal processor 301 to change a color value of a video signal corresponding to an area, which has grayscale equal to or lower than a specific grayscale threshold, among a plurality of areas on an image, based on a plurality of grayscale thresholds and information about a color value and a position of each pixel.

According to still another example embodiment, the controller 309 may transmit information about the grayscale threshold to the signal processor 301, and the signal processor 301 may increase grayscale of a pixel, which is equal to or lower than the grayscale threshold, among a plurality of pixels.

The controller 309 may control the brightness of an image based on ambient illumination. The controller 309 increases brightness if the ambient illumination is high, and changes the grayscale of the image to decrease brightness if the ambient illumination is low. Accordingly, a user's visibility is secured even though external illumination is high. To control the brightness, the controller 309 may change not only the grayscale of the image, but also intensity of light emitted from the light source 311.

According to still another example embodiment, the display apparatus 1 includes the sensor 305 for sensing the brightness of an image displayed on the display panel 310. The controller 309 calculates optical transmittance of the display panel 310 by comparison between the brightness measured by the sensor 305 and the brightness of the image based on the video signal. In accordance with the calculated transmittance and the ambient illumination, the grayscale of the image may be changed or the light source 311 may be controlled to emit light with proper intensity, thereby improving a user's image visibility. In case where the display panel 310 is achieved by a reflectivity-variable mirror display of which optical reflectivity and transmittance are actively varied depending on external illuminance, or a user attaches an additional film or the like to the display panel 310 so that the optical transmittance of the display panel 310 is varied from a default value, the varied optical transmittance is taken into account, thereby providing an image improved in visibility.

Figure 4:
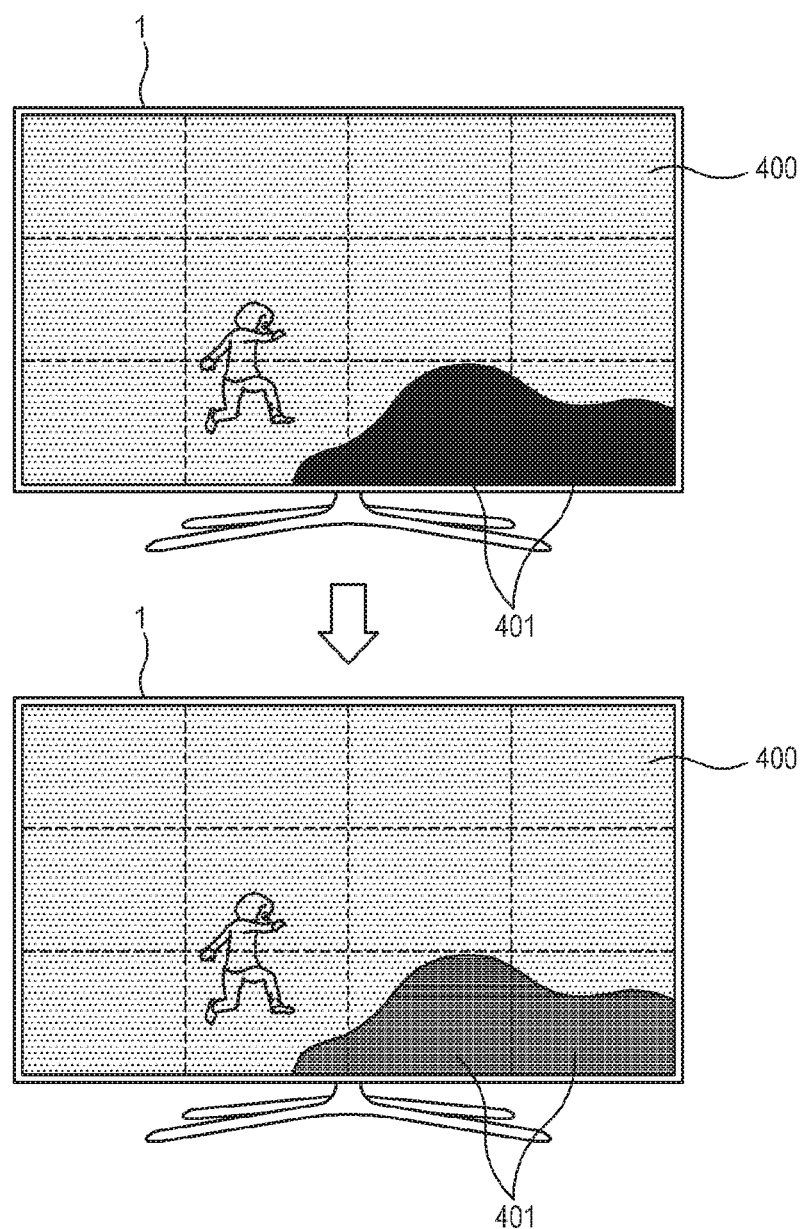
FIG. 4 is a diagram illustrating an example in which the display apparatus adjusts grayscale corresponding to some among a plurality of areas in a displayed image according to an example embodiment.

FIG. 4 is a diagram illustrating an example in which the display apparatus according to an example embodiment adjusts grayscale corresponding to some among a plurality of areas in a displayed image.

Although average grayscale of a displayed image is equal to or higher than the grayscale threshold, glare may occur in a low-grayscale area 401 where reflected light is noticeable due to low brightness. To prevent the glare, according to this example embodiment, the controller 309 calculates grayscale in a plurality of areas 400. To make a user free from the glare with inconspicuous reflected light, the controller 309 controls the signal processor 301 to increase grayscale of a video signal corresponding to the area 401 where calculated grayscale is equal to or lower than the grayscale threshold.

In FIG. 4, an upper part illustrates an example in which an image is sectioned into a plurality of areas 400 before correction, and a lower part shows an example that the display 307 displays an image based on a corrected video signal after the signal processor 301 increases the grayscale of the video signal corresponding to the areas 401, of which the grayscale is equal to or lower than the grayscale threshold, under control of the controller 309.

Figure 5:
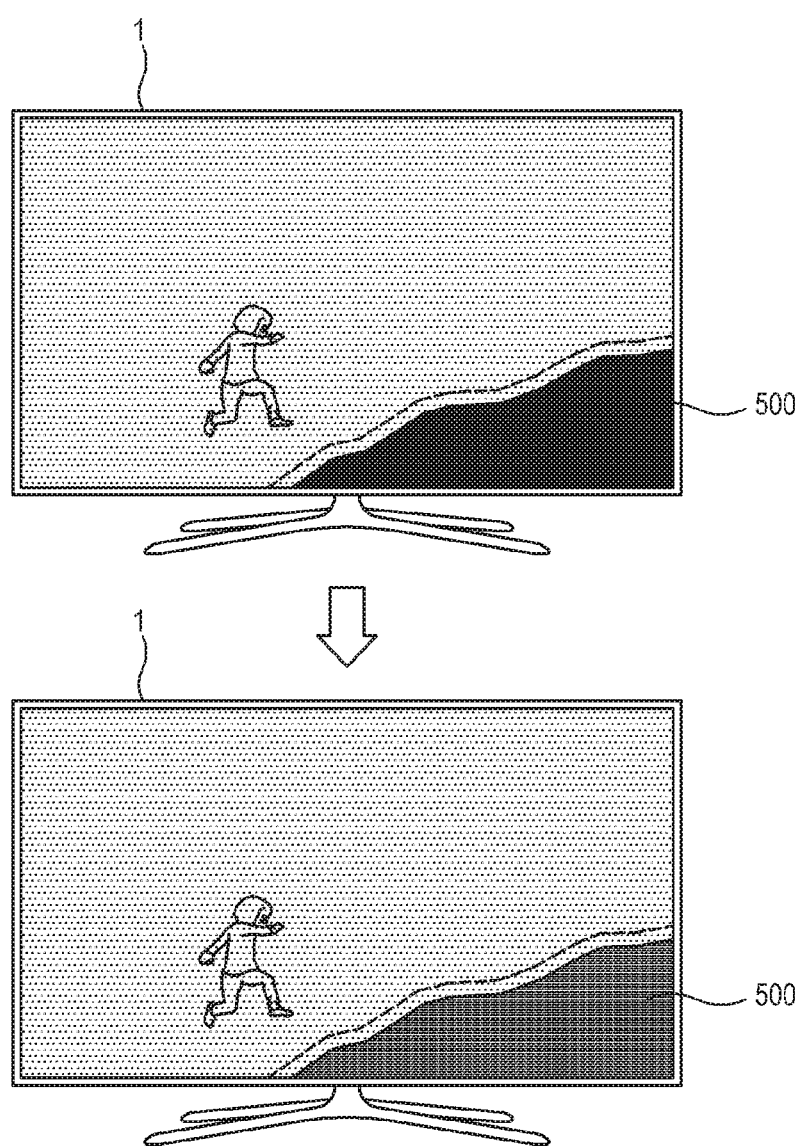
FIG. 5 is a diagram illustrating an example in which the display apparatus adjusts grayscale corresponding to some areas sectioned according to grayscale in a displayed image according to an example embodiment.

FIG. 5 is a diagram illustrating an example in which the display apparatus according to an example embodiment adjusts grayscale corresponding to some areas sectioned according to grayscale in a displayed image.

If the grayscale is increased in the area having the grayscale equal to or lower than the grayscale threshold on the image sectioned into the plurality of areas, color difference may be caused in between the areas. To prevent the color difference, the controller 309 according to this example embodiment sets a plurality of grayscale thresholds. The controller 309 sections the image into a plurality of areas according to the plurality of grayscale thresholds, and controls the signal processor 301 to increase the grayscale of the video signal corresponding to the area having grayscale equal to or lower than a specific grayscale threshold.

In FIG. 5, an upper part illustrates an example of an image before correction, and a lower part shows an example that the image is sectioned into an area having grayscale higher than the grayscale threshold and an area 500 having grayscale equal to or lower than the grayscale threshold under control of the controller 309, and the display 307 displays an image based on a corrected video signal after increasing the grayscale of the video signal corresponding to the area 500 having grayscale equal to or lower than the grayscale threshold. As described above, there may be a plurality of grayscale thresholds set for sectioning the image.

Figure 6:
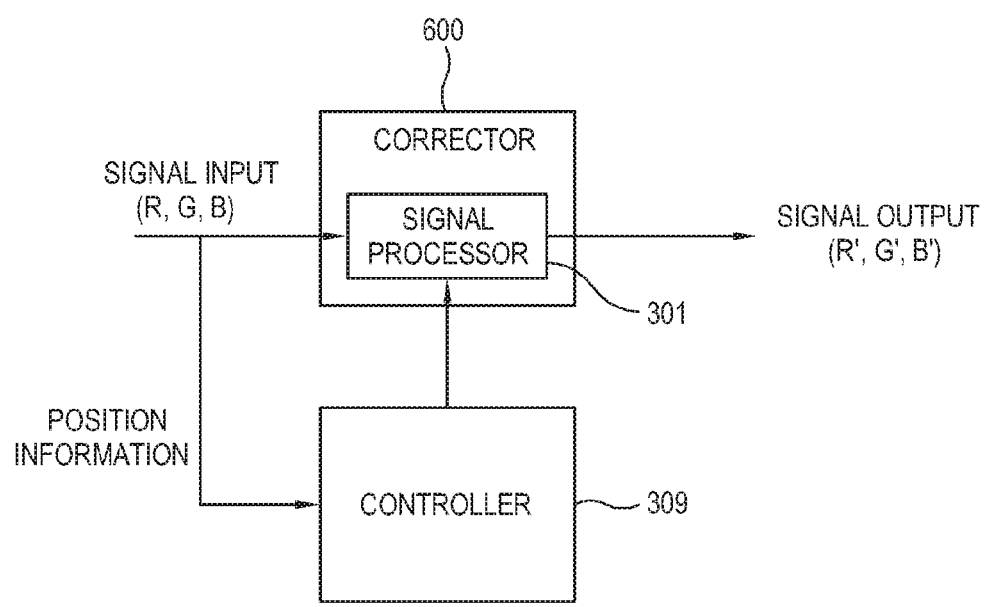
FIG. 6 is a diagram illustrating example operations of a signal processor and a controller according to an example embodiment.

FIG. 6 is a diagram illustrating example operations of a signal processor and a controller according to an example embodiment.

The video signal has information about color values R, G and B and a position of each pixel in an image. Under control of the controller 309, the signal processor 301 processes a video signal based on the information about the position and color values of each pixel, and provides the processed video signal to the display 307. The signal processor 301 may include a corrector 600 including various circuitry and/or program elements for correcting the color values of the pixel and outputting the corrected color values R', G' and B'.

The controller 309 calculates average grayscale of an image based on color values of each pixel included in a video signal, and controls the signal processor 301 to increase the grayscale of the video signal corresponding to all the pixels if the calculated grayscale is equal to or lower than the grayscale threshold.

In the foregoing example embodiment where the controller 309 sections an image into a plurality of areas and increases the grayscale in some areas having grayscale equal to or lower than the grayscale threshold among the plurality of areas, the controller 309 determines the areas, of which the grayscale equal to or lower than the grayscale threshold, based on the information about the position and color values of each pixel. Then, the controller 309 controls the signal processor 301 to increase the grayscale of the video signal corresponding to the determined areas.

In the foregoing example embodiment where the controller 309 sections an image into the areas according to the grayscale threshold, the controller 309 sections the image into the plurality of areas corresponding to the plurality of grayscale thresholds, based on the information about the position and color values of each pixel. Then, the controller 309 controls the signal processor 301 to increase the grayscale of the video signal in the area corresponding to a specific grayscale threshold.

According to another example embodiment, the controller 309 transmits the grayscale threshold to the signal processor 301, and the signal processor 301 increases the color values of the pixel, of which the grayscale is equal to or lower than the grayscale threshold, among the plurality of pixels. That is, the controller 309 increases the grayscale of all the pixels, of which the grayscale is equal to or lower than the grayscale threshold, among the plurality of pixels involved in the image.

Figure 7:
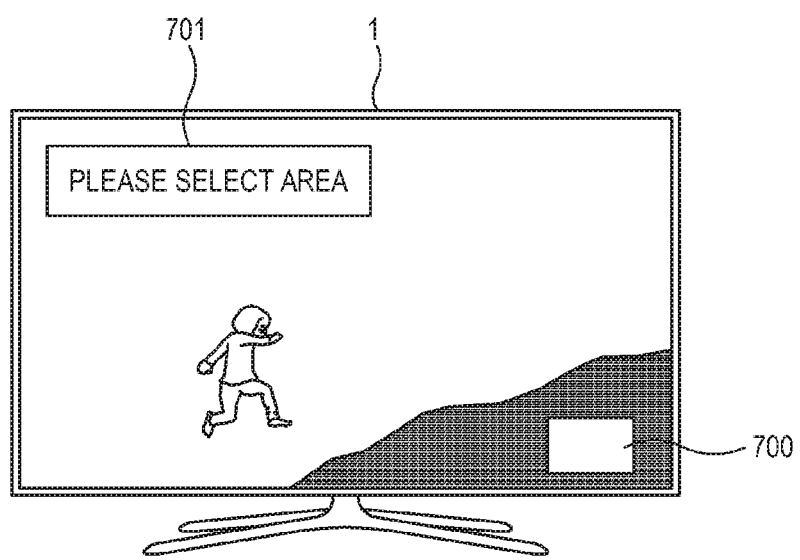
FIG. 7 is a diagram illustrating an example of a user interface (UI) provided to set a reflective area according to an example embodiment.

FIG. 7 is a diagram illustrating an example of a user interface (UI) provided to set a reflective area according to an example embodiment.

A user may feel glare as light is reflected from only some specific areas of the display 307, and set the area, from which the glare will be removed, through a displayed UI 701. If the grayscale of the set area is equal to or lower than the grayscale threshold, the controller 309 increases the grayscale of the set area so as to prevent and/or reduce the glare in the set area, thereby improving convenience.

Thus, the controller 309 according to an example embodiment controls the display 307 to provide the UI 701 through which a user can set some areas e.g., 700 to remove the glare. If the grayscale of some areas set by a user's input to the UI is equal to or lower than the grayscale threshold, the controller 309 controls the signal processor 301 to increase the grayscale of the video signal corresponding to the areas.

Figure 8:
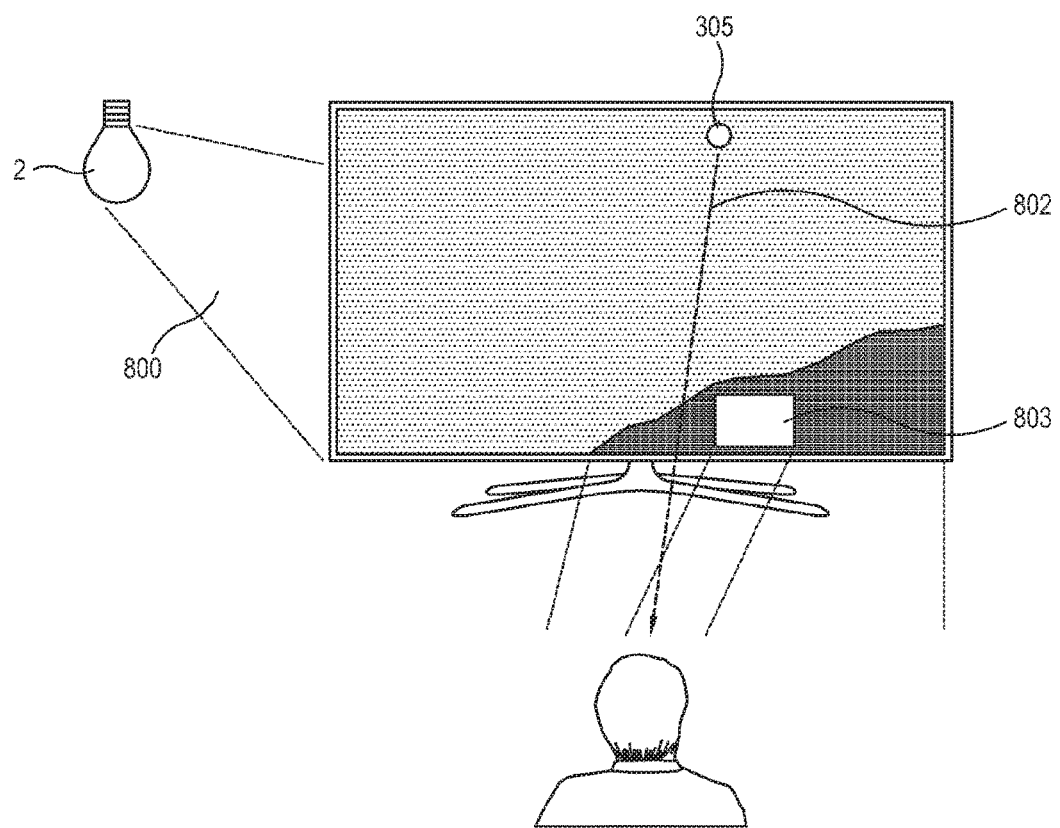
FIG. 8 is a diagram illustrating an example of sensing an incident angle of light and a user's position, determining an area based on sensing results and adjusting grayscale according to an example embodiment.

FIG. 8 is a diagram illustrating an example of sensing an incident angle of light and a user's position, determining an area based on sensing results and adjusting grayscale according to an example embodiment.

Based on not only the ambient illumination but also an angle of light incident upon the display 307, a user's position, etc., the display apparatus 1 may determine whether incident light is reflected toward a user, determine which areas of the image reflect the light, and adjusts the grayscale of the image based on the determination.

The sensor 305 may include various sensing circuitry, such as, for example, and without limitation, a plurality of optical detectors having photoconductive devices in order to detect the incident angle of light. As the photoconductive devices, there is a cadmium sulfide (CdS) cell or the like where free electrons are produced in proportion to intensity of incident light and make change of an electric current to thereby decrease resistance. However, the photoconductive device is not limited to the CdS cell. The plurality of optical detectors are arranged in the display panel 310, and intensity of light detected in each optical detector is transmitted to the controller 309. The controller 309 calculates and determines the positon of the external light source 2 and the incident angle of the external light, based on the intensity of the light transmitted from each of the plurality of optical detectors. The sensor 305 may further include a position detector having a camera, a range finder, etc. to detect a user's position and a distance 802 to the user's position.

The controller 309 determines whether incident light 800 is reflected toward a user, based on information about ambient illumination, an incident angle of the light, a user's position, etc. sensed in the sensor 305, and determines some areas on the image 803, from which the light is reflected, if it is determined that the incident light is reflected. The controller 309 controls the signal processor 301 to increase the grayscale of the video signal corresponding to some areas 803 if it is determined that the grayscale of the areas is equal to or lower than the grayscale threshold.

As described above, the external sensor may transmit information about at least one of the ambient illumination, the incident angle of the light, and the position of the user through the communicator 303.

Figure 9:
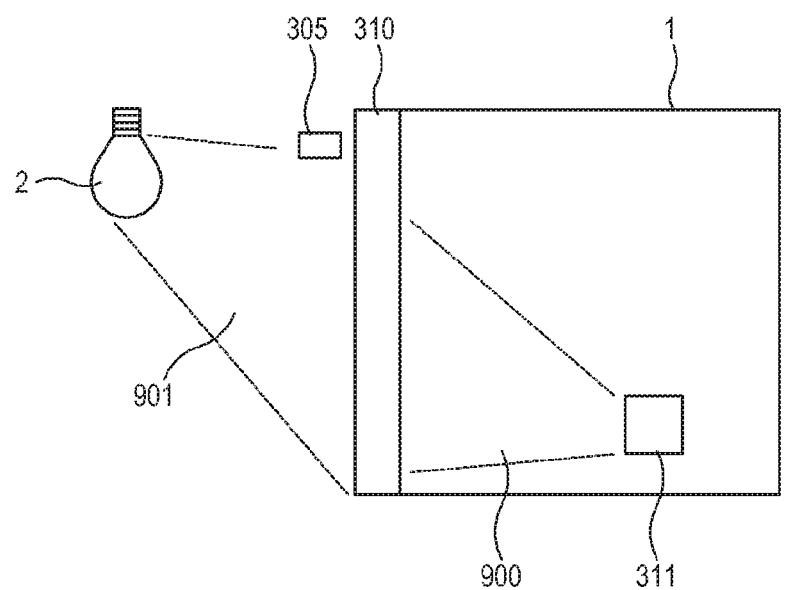
FIG. 9 is a diagram illustrating an example of sensing transmittance of a display panel, and adjusting intensity of light emitted from a light source based on the sensed transmittance according to an example embodiment.

FIG. 9 is a diagram illustrating an example of sensing transmittance of a display panel, and adjusting intensity of light emitted from a light source based on the sensed transmittance according to an example embodiment.

The controller 309 may control brightness of an image in accordance with ambient illumination 901 in order to improve a user's visibility. To control the brightness, the controller 309 may adjust grayscale of an image or adjust intensity of light 900 emitted from the light source 311. However, the optical transmittance of the display panel 310 is varied depending on an attached film, coating or the like of the display panel 310. Further, if the display panel 310 is a reflectivity-variable mirror display of which reflectivity is varied depending on external illumination, the optical transmittance of the display panel 310 may be also varied depending on the variance in the reflectivity. Therefore, the brightness of the displayed image may be different from the brightness determined by the controller 309 based on the ambient illumination.

The sensor 305 senses brightness of an image at the outside of the display apparatus 1, and the controller 309 calculates the transmittance of the display panel 310 based on the brightness of the image sensed at the outside, the grayscale of the displayed image, and the intensity of the light emitted from the light source 311. The controller 309 changes the grayscale of the image or adjusts the intensity of the light emitted from the light source 311 to the display panel 310 based on the calculated transmittance and the ambient illumination, thereby controlling the brightness of the image by taking the transmittance of the display panel 310 into account.

Figure 10:
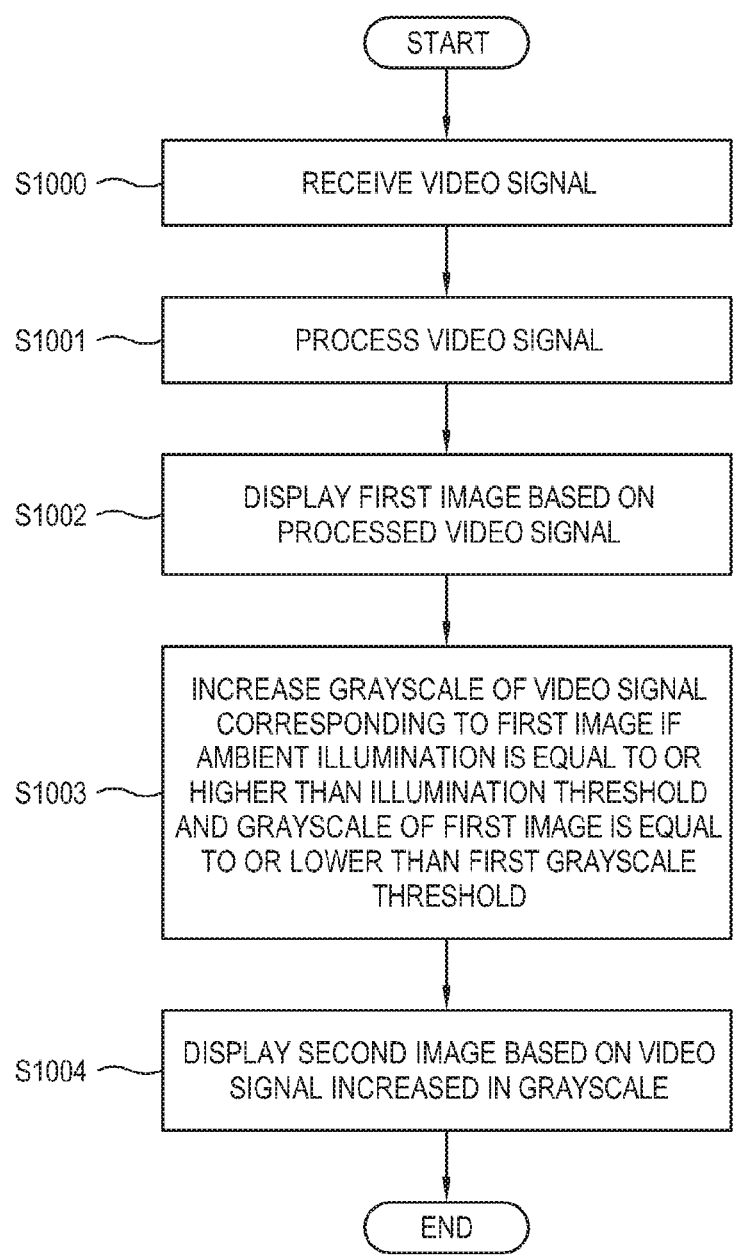
FIG. 10 is a flowchart illustrating an example method of controlling a display apparatus according to an example embodiment.

FIG. 10 is a flowchart illustrating an example method of controlling a display apparatus according to an example embodiment.

At operation S1000, the signal receiver 300 receives a video signal from the exterior. At operation S1001, the signal processor 301 processes the received video signal and transmits it to the display 307. Then, at operation S1002, the display 307 displays a first image based on the processed video signal. At operation S1003, the controller 309 controls the signal processor 301 to increase the grayscale of the video signal corresponding to the first image, if the ambient illumination is equal to or higher than the illumination threshold and the grayscale of the first image is equal to or lower than the first grayscale threshold. At operation S1004, the display 307 displays a second image based on the video signal corrected to increase the grayscale.

As described above, according to an example embodiment, grayscale of an image is adjusted to thereby make reflection of light incident upon the display become inconspicuous, and it is thus convenient for a user.

Although various example embodiments have been illustrated and described, it will be appreciated by those skilled in the art that changes may be made in these example embodiments without departing from the principles and spirit of the disclosure, the scope of which is defined in the appended claims and their equivalents.

What is claimed is:

1. A display apparatus comprising:
    a signal receiver configured to receive a video signal;
    a signal processor configured to process the received video signal;
    a display configured to display a first image based on the processed video signal; and
    a controller configured to control the signal processor to increase grayscale of the video signal corresponding to the first image if ambient illumination is equal to or higher than an illumination threshold and grayscale of the first image is equal to or lower than a first grayscale threshold, and to control the display to display a second image based on a video signal increased in the grayscale.

2. The display apparatus according to claim 1, wherein the controller is configured to control the signal processor to increase grayscale of a video signal corresponding to a partial area having a grayscale equal to or lower than a second grayscale threshold, on the first image.

3. The display apparatus according to claim 2, wherein the controller is configured to control the display to display a user interface (UI) for setting the partial area.

4. The display apparatus according to claim 2, further comprising a sensor configured to sense the ambient illumination, wherein
    the sensor comprises:
    an optical detector configured to detect an angle of light incident upon the display; and
    a position detector configured to detect a position of a user, and wherein
    the controller is configured to control the signal processor to increase grayscale of a video signal corresponding to the partial area if grayscale of the partial areas on the first image are equal to or lower than the second grayscale threshold based on the detected angle of the light and the detected position of the user.

5. The display apparatus according to claim 1, further comprising a communicator comprising communication circuitry configured to communicate with an external sensor configured to sense ambient illumination and to provide information about the sensed ambient illumination.

6. The display apparatus according to claim 1, wherein
    the first image comprises a plurality of pixels, and
    the controller is configured to control the signal processor to increase grayscale of a video signal corresponding to a pixel having a grayscale equal to or lower than a third grayscale threshold, from among the plurality of pixels.

7. The display apparatus according to claim 1, wherein the controller is configured to control brightness of the image based on the ambient illumination.

8. The display apparatus according to claim 7, wherein the display comprises:
    a display panel configured to display an image with emitted light; and
    a light source configured to emit light to the display panel; and the controller is configured to control the brightness of the image by adjusting intensity of light emitted to the display panel.

9. The display apparatus according to claim 8, further comprising a sensor configured to sense the brightness of the displayed image, wherein
the controller is configured to determine transmittance of the display panel based on the sensed brightness of the image and the intensity of light emitted to the display panel, and to adjust the intensity of the light emitted to the display panel based on the determined transmittance and the sensed ambient illumination.

10. The display apparatus according to claim 1, wherein the illumination threshold is varied depending on the grayscale of the first image having a grayscale equal to or lower than the first grayscale threshold.

11. A method of controlling a display apparatus, the method comprising:
receiving a video signal;
processing the received video signal;
displaying a first image based on the processed video signal;
increasing grayscale of the video signal corresponding to the first image if ambient illumination is equal to or higher than an illumination threshold and grayscale of the first image is equal to or lower than a first grayscale threshold; and
displaying a second image based on a video signal increased in the grayscale.

12. The method according to claim 11, wherein the increasing the grayscale of the video signal comprises increasing grayscale of a video signal corresponding to a partial area, having grayscale equal to or lower than a second grayscale threshold, on the first image.

13. The method according to claim 12, further comprising: displaying a user interface (UI) for setting the partial area.

14. The method according to claim 12, wherein the increasing the grayscale of the video signal comprises
sensing the ambient illumination;
detecting an incident angle of light;
detecting a position of a user; and
increasing grayscale of a video signal corresponding to the partial area if grayscale of the partial areas on the first image are equal to or lower than the second grayscale threshold based on the detected angle of the light and the detected position of the user.

15. The method according to claim 11, further comprising: communicating with an external sensor that senses ambient illumination and provides information about the sensed ambient illumination.

16. The method according to claim 11, wherein
the first image comprises a plurality of pixels, and
the increasing the grayscale of the video signal comprises increasing grayscale of a video signal corresponding to a pixel, having a grayscale equal to or lower than a third grayscale threshold, from among the plurality of pixels.

17. The method according to claim 11, further comprising controlling brightness of the image based on the ambient illumination.

18. The method according to claim 17, wherein
the displaying the first image comprises:
displaying first image with light emitted to a display panel; and
emitting light to the display panel, and
the controlling the brightness of the image comprises adjusting intensity of light emitted to the display panel.

19. The method according to claim 18, wherein the adjusting the intensity of light emitted to the display panel comprises:
sensing the brightness of the displayed image;
determining transmittance of the display panel based on the sensed brightness of the image and the intensity of light emitted to the display panel; and
adjusting the intensity of the light emitted to the display panel based on the determined transmittance and the sensed ambient illumination.

20. The method according to claim 11, wherein the illumination threshold is varied depending on the grayscale of the first image having a grayscale equal to or lower than the first grayscale threshold.

* * * * *